Nov. 15, 1966  E. A. DE VOSS  3,285,102
DRILLING ASSEMBLY
Filed May 4, 1964  4 Sheets-Sheet 1
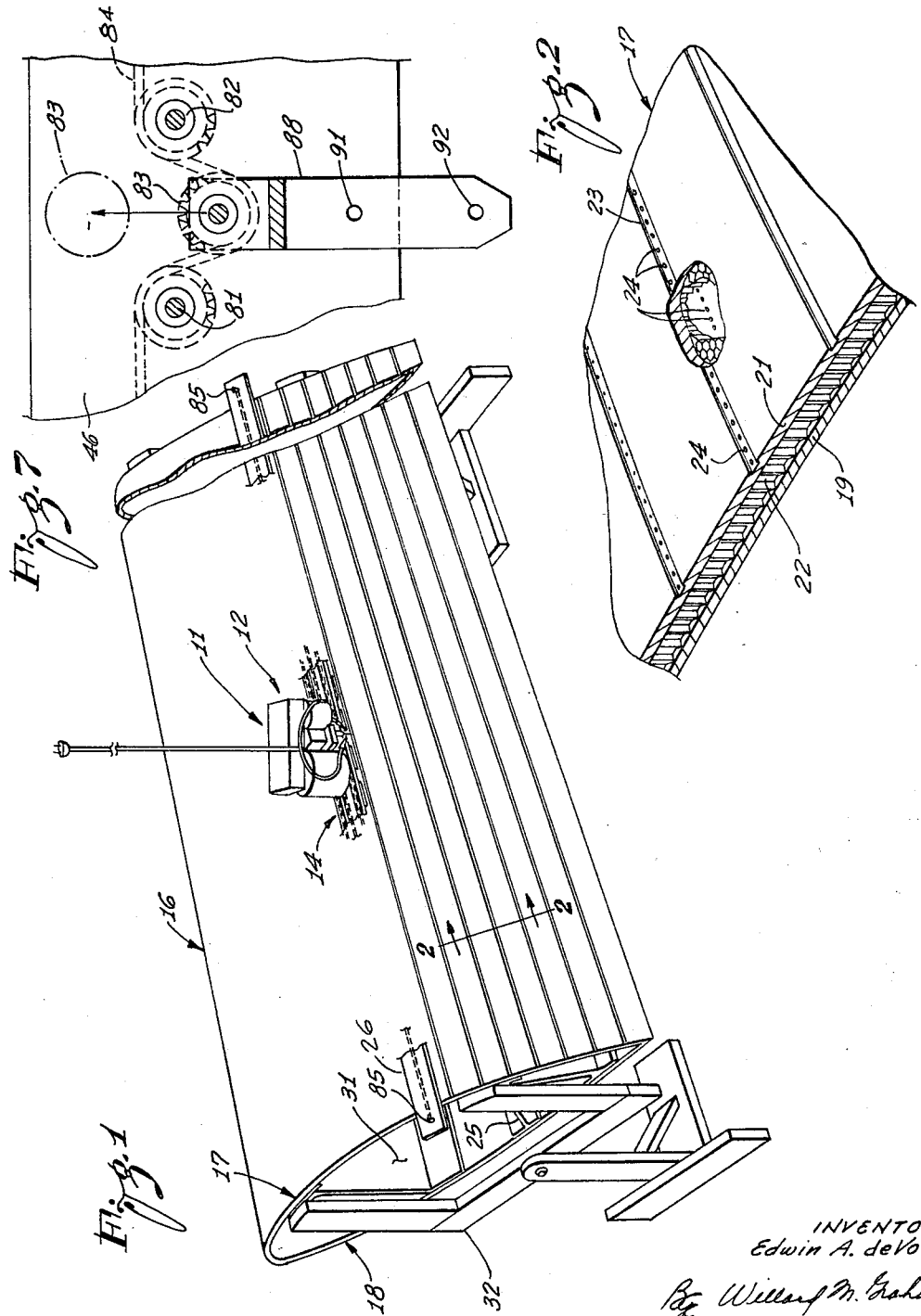
INVENTOR
Edwin A. deVoss
By Willard M. Graham
Agent

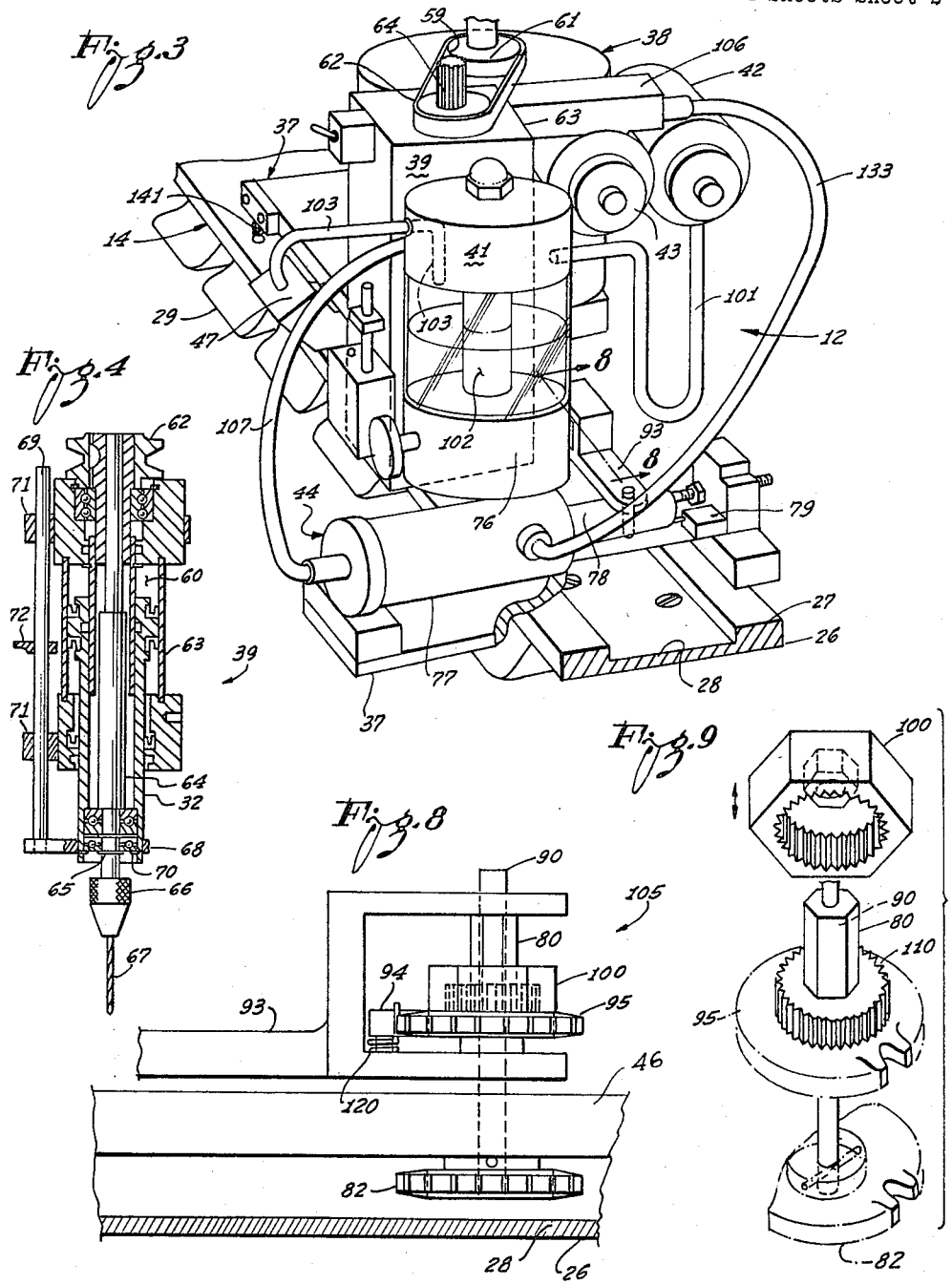

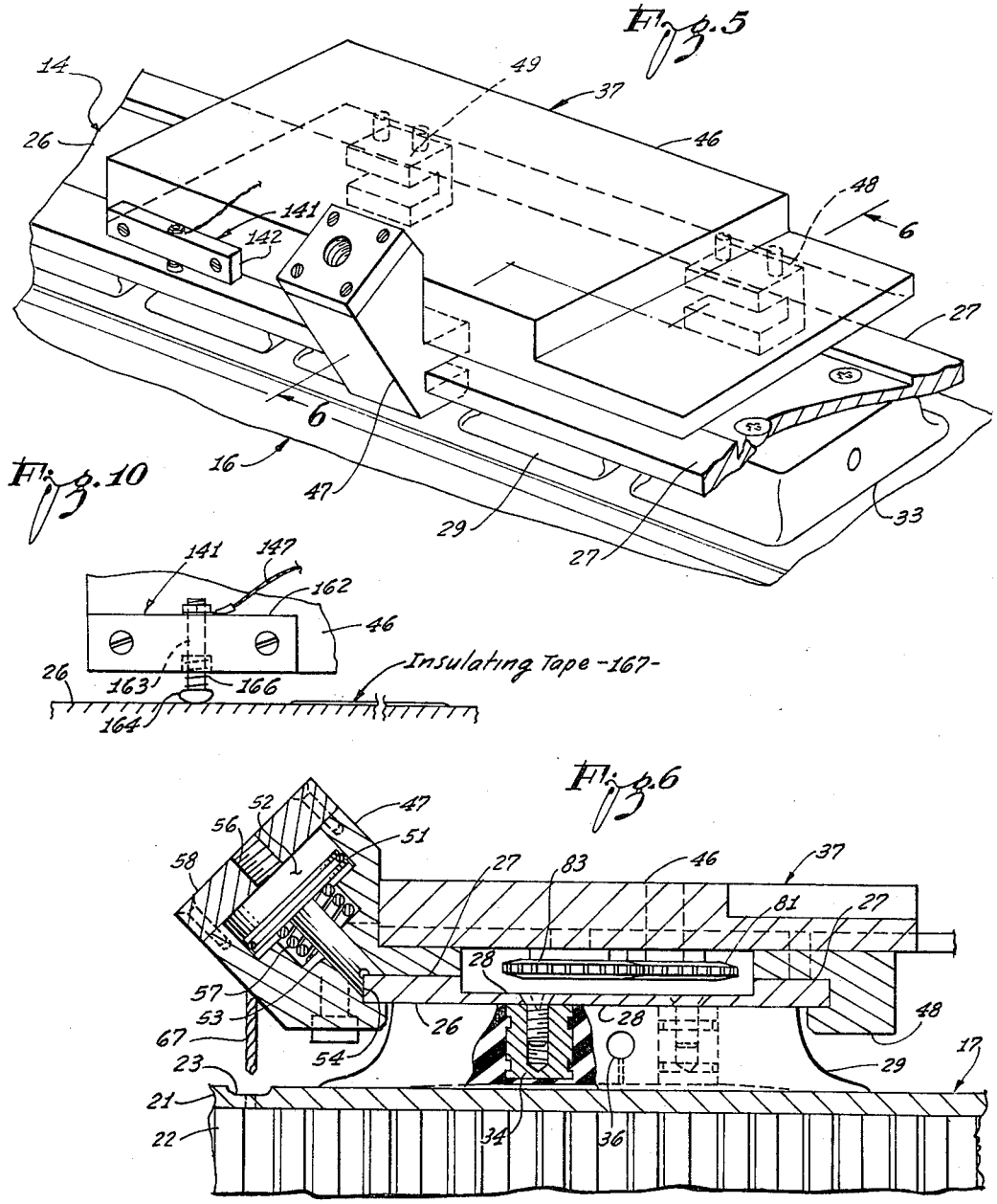

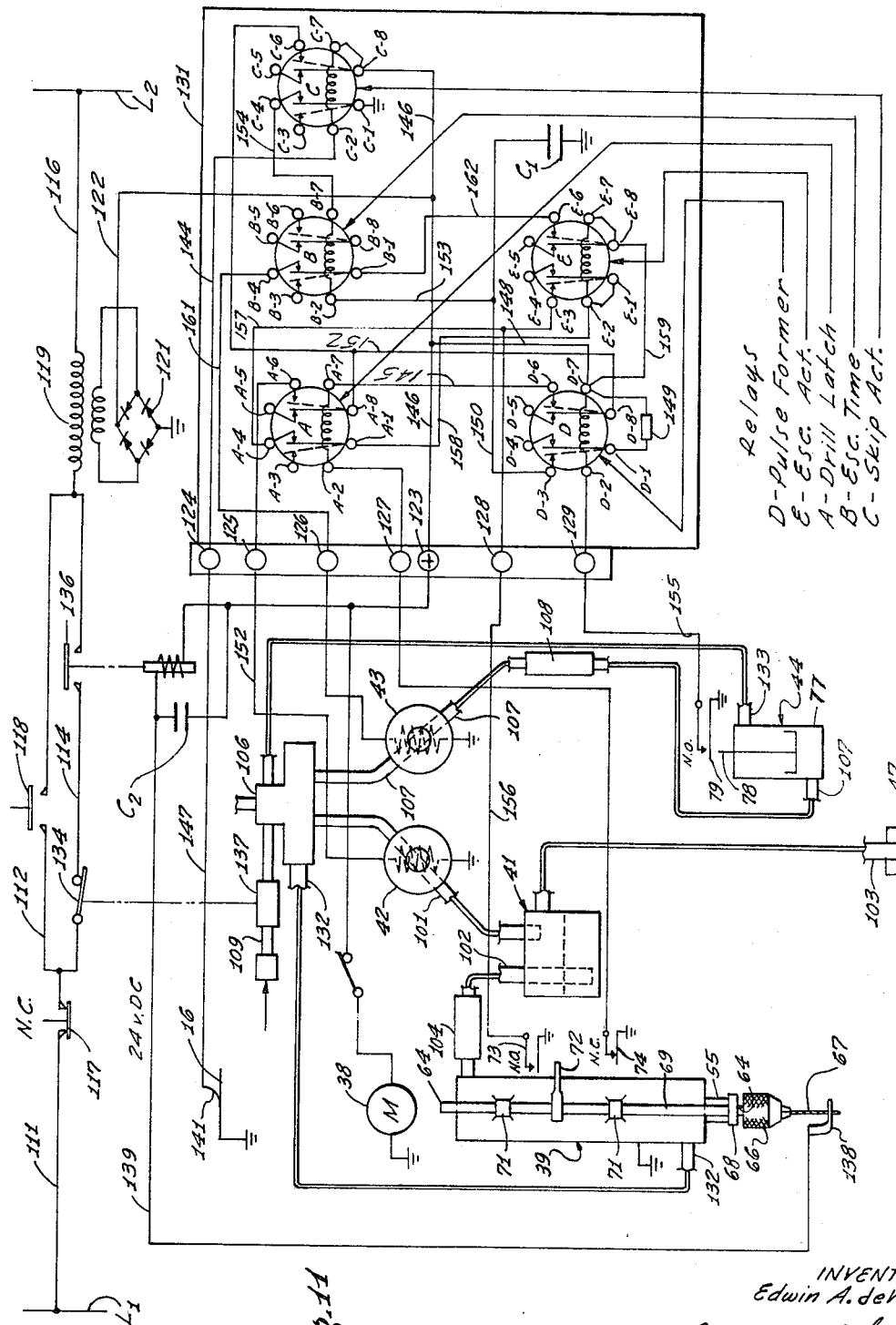

United States Patent Office 3,285,102
Patented Nov. 15, 1966

3,285,102
DRILLING ASSEMBLY
Edwin A. de Voss, Torrance, Calif., assignor to Northrop Corporation, Beverly Hills, Calif., a corporation of California
Filed May 4, 1964, Ser. No. 364,579
6 Claims. (Cl. 77—13)

This invention pertains to apparatus for effecting precision machining operations and more particularly to a drilling assembly including a drilling unit adapted to drill a predetermined pattern of holes in a structure having either flat or contoured surfaces.

For purposes of illustration, the drilling assembly as disclosed herein is shown and described in connection with the fabrication of a wing panel for an airplane. The airplane under consideratioin embodies means for removing boundary layer air from the surface thereof, consequently it follows that the external panels of the airplane also include means for removing boundary layer air from their surfaces.

A recognized method of removing boundary layer air from the surface of an airplane involves the drilling of a multiplicity of holes in the external panels of the airplane. For example, the wings of an average sized airplane may require the drilling of approximately seven (7) miles of holes spaced on one quarter inch centers. Should the spacing of these holes vary appreciably, suction effecting the removal of boundary layer air will be adversely affected.

Fabricating panels of this type present numerous and complex problems including: (1) the fact that the panels include both flat and contoured portions, (2) the honeycomb section does not provide proper support for a drill bit during the drilling operation and (3) the rapidity at which the drilling operation must necessarily be carried out if excessive time is not to be consumed in effecting the same.

Briefly, the present assembly includes an automatic drilling unit which among other things embodies a bit-breakage surveillance feature and also a feature insuring that certain of the holes normally to be drilled will be skipped. Referring to the drill bit-breakage surveillance feature, this feature relieves the operator of the drilling unit of the responsibility of watching for bit-breakage thus rendering his time available for other and more important duties. The hole skipping feature provides means whereby holes are automatically omitted (not drilled), i.e., the feature precludes drilling operations at locations where the hole or holes if drilled would be formed in structural members. These and other features of the drilling assembly, also the manner of effecting the same, will become apparent as the disclosure progresses.

An object of the present invention is to provide apparatus adapted to automatically and rapidly drill a predetermined pattern of holes in a panel or similar structure, the panel normally having both flat and contoured surfaces.

Another object is to provide apparatus including a drilling unit incorporating a drill breakage surveillance feature adapted to automatically detect drill breakage that may occur during a drilling operation.

Another object is to provide apparatus including a drilling unit incorporating a feature insuring a discontinuance of drilling operations while maintaining normal spacing operations.

Another object is to provide apparatus including a drilling unit and track member insuring that holes drilled by the drilling unit will have substantially a normal relation with respect to the contoured surface of a panel.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 is a perspective view of the drilling assembly as disclosed herein mounted in its operating position on a wing panel of an airplane.

FIGURE 2 is an enlarged fragmentary view of the upper skin assembly of the panel of FIGURE 1 as viewed along the plane 2—2 of FIGURE 1.

FIGURE 3 is an enlarged perspective view of the drilling assembly of FIGURE 1.

FIGURE 4 is a longitudinal sectional view in detail of the spindle assembly of FIGURE 3.

FIGURE 5 is an enlarged fragmentary view of the wing panel of FIGURE 1 showing the track and base members as disclosed herein.

FIGURE 6 is a sectional view of FIGURE 5 taken along the line 6—6 of FIGURE 5.

FIGURE 7 is a bottom view of the base member of FIGURES 5 and 6.

FIGURE 8 is a view taken on the line 8—8 of FIGURE 3.

FIGURE 9 is an exploded view of the adjusting mechanism of FIGURE 8.

FIGURE 10 is a fragmentary view showing means making possible the hole skipping feature of the drilling unit.

FIGURE 11 is a schematic view of the drilling unit of FIGURE 3 showing electrical and fluid lines rendering the unit operational.

Referring to the drawings, FIGURE 1 shows a drilling assembly as disclosed herein identified in its entirety by the numeral 11. The assembly 11 includes a drilling unit 12 and track means 14 mounted on a wing panel 16 incorporating means for drilling holes therein by means of which boundary layer air is removed from the panel.

The construction of the upper and lower skin assemblies 17 and 18 of the panel 16 is identical, accordingly the description of one will apply equally well to the other. Referring to FIGURE 2, the upper skin assembly includes inner and outer skin members 19 and 21, respectively, having a honeycomb core section 22 bonded therebetween. Epoxy glue or other adhesive material normally harder than the material from which the members 19 and 21 and the section 22 are fabricated is utilized in bonding section 22 to the skin members 19 and 21. Machined in the outer skin member 21 is a plurality of grooves 23 extending longitudinally of the panel 16, the grooves 23 opening on the outer surface of the skin member 21. A multiplicity of accurately spaced holes 24 are drilled in the grooves 23 and extend through the members 19, 21 and section 22.

The construction of the panel 16 is completed after the grooves 23 and holes 24 are fabricated therein by covering the panel with a thin sheet member (not shown) constituting the external skin of the panel 16. Extremely narrow slits (not shown), coextensive with each of the grooves 23, are provided in the aforementioned sheet member, the slits functioning to allow ingress of boundary layer air to the grooves 23. Also provided internally of the panel 16 are longitudinally extending structural members 25 which impart structural strength to the panel 16 and also function to provide ducts 31 communicating with the holes 24.

The construction of the panel 16 constitutes no part of the present invention but is described to provide background information and to provide a better understanding of the problems involved in fabricating a contoured panel such as the panel 16.

The track means 14 constitutes an elongated plate-like member 26 the longitudinal side edges of which constitute ways for the unit 12 as best seen in FIGURE 3. Referring to FIGURES 3, 5 and 6 it will be seen that the central portion 28 of the member 26 is reduced in thickness with respect to the ways 27. This type of construction renders the member 26 partially flexible enabling it to contour to the surfaces of the panel 16. Due to the flexibility of the member 26 is cooperates with the unit 12 enabling the latter to drill holes substantially normal to the surface of the panel 16 for reasons presently explained. It will also be seen by referring to FIGURE 1 that the member 26 is of sufficient length allowing it to extend beyond the ends of the panel 16 thus allowing the unit 12 to drill holes throughout the length of the panel.

Contouring of the member 26 to the surface of the panel 16 in the above manner is insured by a series of spaced vacuum cups 29 secured to the underside of the member 26. Moulded within the cups 29 are inserts 34 constructed of non-compressible material, also provided in the cups 29 are passageways 36 providing fluid communication therebetween. It will now be apparent that with the cups 29 mounted on a smooth surface of the panel 16 and a vacuum applied thereto, they (cups 29) function to provide a force causing the member 26 to contour to the surface of the panel 16 and spacing the ways 27 a predetermined distance above the surface of outer skin.

Referring to FIGURE 3 it will be seen that the unit 12 includes the following major components: a base assembly 37, an electric motor 38, a spindle assembly 39, a feed assembly 41, solenoid valve assemblies 42 and 43 and an escapement assembly 44.

The base assembly 37 includes a rectangular shaped base member 46 substantially as shown in FIGURES 5 and 6. The member 46 is slideably mounted on the track member 26 by means of three gibs, one an air actuated gib 47 and a pair of fixed gibs 48 and 49. The two fixed gibs are secured to one side of the base member 46 adjacent the ends thereof, the air actuated gib 47 is secured to the opposite edge of the member 46 at a position midway between the fixed gibs. The gibs 47, 48 and 49 embrace the ways 27 with sufficient clearance therebetween allowing the member 46 to be moved along the ways even though the member 26 is twisted to conform to the surface of the panel 16.

The portion of the gib 47 that embraces its associated way is similar in construction to the fixed gibs 48 and 49, however, the gib 47 includes structure enabling it to operate automatically. Structure enabling the gib 47 to function automatically includes a piston 51 mounted in a chamber 52 formed in the gib 47. The piston 51 carries a pin 53 having a ninety degree (90°) notch 54 formed in its free end. A passageway 56 provides ingress and egress for pressurized fluid entering and leaving the chamber 52. A spring 57 returns the piston 51 to its non-effective position in which it contacts and is bottomed with respect to the closure member 58. It will now be apparent that with pressurized fluid in the chamber 52, the pin 53 (notch 54) will be bottomed on the way with which it is associated.

Thus it will be seen that although the base member is of rigid construction it is free to move on the ways 27 at such times as pressurized fluid is not acting on the piston 51 and movement thereof is precluded at such time as pressurized fluid acts on the piston 51. The holes 24 are drilled at such time as movement of the base member 46 on the track member 26 is precluded and spacing or incremental movement of the member 46 occurs at such times as the piston 51 is no longer effective to preclude such movement.

Longitudinal movement of the member 46 on the track member 26 is provided by the escapement actuator assembly 44 cooperating with a sprocket chain and sprockets mounted on the underside of member 46. The construction and function of the aforementioned sprockets and chain will be further discussed in connection with the assembly 44.

Operating components of the unit 12 are mounted on the base member 46 substantially as shown in FIGURE 3, power for the unit 12 being provided by the electric motor 38. The motor 38 drives the spindle assembly 39 by means of a belt 59 in contact with pulleys 61 and 62.

The assembly 39 (FIGURE 4) is of conventional construction including a housing 63 defining a cylindrical chamber 60 having a quill and spindle 32 and 64, respectively, mounted therein. The spindle 64 has a chuck 66 mounted thereon which in turn carries a drill bit 67. The assembly 39 is constructed in a manner insuring that reciprocal movement only is imparted to the quill 32 while rotary and reciprocal movements both are imparted to the spindle 64. Reciprocal movement of the quill 32 is imparted to the spindle 64 by means of retaining rings 65 and 70 located at the lower ends of the quill and spindle.

Rotational movement of the spindle 64 is imparted thereto by the motor 38 acting through the belt 59 and pulley 62. The upper end of the housing 63 provides bearing means for the pulley 62 allowing rotational movement thereof but precluding relative linear movement therebetween. Reciprocal movement only is imparted to the quill 32 as pressurized fluid is directed to the chamber 60. Rotational movement of the quill 64 is arrested by a rod 69 supported by a pair of bearings 71—71 mounted on the housing 63. An arm 68 embraces the lower end of the quill 32 and rod 69 functions to transmit linear movement of the quill 32 to the rod 69. The rod 69 carries a radially extending arm 72 adapted to contact limit switches 73 and 74 (FIGURE 11) for a purpose to be explained presently. The upper ends of the spindle 64 is splined allowing relative movement between the spindle 64 and the pulley 62 in a longitudinal direction but functions to impart rotational movement therebetween. Thus it will be seen that reciprocal movement only is imparted to the quill 32 while reciprocating and rotational movement are both imparted to the spindle 64.

The assembly 41 includes a housing 76 defining a reservoir containing a predetermined quantity of liquid— the quantity (volume) exceeding the volume of the chamber in the assembly 39. Three conduits 101, 102 and 103 (FIGURES 3 and 11) enter the reservoir defined by the housing 76, one end of the conduit 102 extends below the surface of the liquid contained in the housing 76 while the ends of the other two terminate above the surface of the liquid. With the aforementioned reservoir pressurized by compressed air entering through the conduit 101, it will be apparent that pressurized liquid and compressed air will be directed through conduits 102 and 103, respectively, for a purpose which will be explained presently.

The valves 42 and 43 constitute conventional two-way solenoid actuated valves. As best seen in FIGURE 11, at such times as the solenoid of the valve 42 is energized a fluid path is provided through the conduit 101 between a manifold 106 and the assembly 41, when the solenoid of the valve 43 is energized a fluid path is provided through a conduit 107 between manifold 106 and the escapement actuator assembly 44. At such times as the solenoids of the valves 42 and 43 are deenergized they port air returning through the conduits 101 and 107 to the atmosphere. The valve 42, hereafter referred to as the drill control valve, controls the flow of air to and from the assembly 39. The valve 43, hereafter referred to as the escapement valve, controls the flow of air to and from the escapement assembly 44.

Longitudinal travel or spacing of the unit 12 on the track member 26 is effected by the escapement assembly 44 cooperating with a sprocket chain 84 and sprockets 81, 82 and 83 as best seen in FIGURE 7.

The assembly 44 includes a housing 77 having a piston (not shown) mounted therein, the piston carrying a piston rod 78. The aft end of the housing 77 is pivotally mounted on the base member 46 and the rod 78 when fully extended operates a limit switch 79.

The aforementioned sprockets 81 and 82 are pivotally mounted in spaced relation on the under side of the base member 46 as shown in FIGURE 7. Also mounted on the underside of the member 46, at a location midway between the sprockets 81 and 82, is a member 88. The member 88, generally of rectangular configuration, is dovetailed into the lower surface of the member 46. This feature enables the member 88 to be slideably moved in a direction normal to the ways 27 between retracted and extended positions. The sprocket 83 is rotatably mounted on and moves with the member 88 between engaged and non-engaged positions with respect to a sprocket chain 84 shown in solid and dotted line construction, respectively, in FIGURE 7.

In being moved from its non-engaged to its engaged position the sprocket 83 contacts the chain 84 removing slack therefrom and urging the chain into firm contacting relation with the sprockets 81 and 82. In this respect it will be seen by referring to FIGURE 1 that the ends of the chain are adjustably secured at the ends of the track member 26 as indicated by the numerals 85—85. Pin means (not shown), mounted in the member 46, adapted to be positioned in the holes 91 or 92 formed in the member 88 and thus maintain the sprocket 83 in its engaged or non-engaged position.

The sprocket 82 is mounted on and rotates with the pin 90, also mounted on the pin 90 at a location above the base member 46 is a bifurcated link 93 and an adjusting mechanism 105 as best seen in FIGURE 8. The plain end of the link 93 is pivotally secured to the free end of the piston rod 78 (FIGURE 3) while its bifurcated ends are pivotally mounted on the pin 90.

The adjusting mechanism 105 includes a sprocket 95, a sleeve member 80 and nut member 100, the sprocket 95 being mounted for free rotation on the pin 90. The sleeve member 80 is mounted above the sprocket 95 and extends to the upper arm of the link 93. The sleeve member 80 is hexagonal in cross-section and is rendered integral with the pin 90 and therefore rotates therewith. The sprocket 95 includes an integral hub portion 110 the wall portions of which are serrated. The nut member 100 has a cylindrical-hexagonal aperture formed therein as best seen in FIGURE 9, the cylindrical portion of this aperture is serrated and is of a size allowing it to mate with the serrations on the hub portion of the sprocket 95.

It will now be apparent that with the adjusting mechanism in its assembled relation on the pin 90 as shown in FIGURE 8, the sprocket 95 will be rendered integral with the sprocket 82. In other words rotation of the sprocket 95 will be transmitted to the sprocket 82 the latter acting through the chain 84 results in longitudinal movement of the base member 46, consequently the unit 12, on the track member 26.

Incremental rotational movement, equal to the pitch of the sprocket 95, is imparted to the sprocket 95 by action of the link 93 which in turn is provided by action of the escapement assembly 44. In this respect, a pawl 94 contacts a different tooth of the sprocket 95 and functions to advance the sprocket 95 each time the piston rod 78 is retracted and subsequently extended. The pawl 94 is continuously urged into contacting relation with the sprocket 95 by a spring 120.

At such times as the nut 100 is spaced or raised above the hub 110 the serrations of the hub 110 and nut 100 no longer mate. Under these conditions it will be apparent that the sprocket 82 and the pin 90 are free to rotate while rotation of the sprocket 95 is arrested by the pawl 94. Thus it will be seen that the adjusting mechanism 105 provides means whereby the unit 12 can be manually moved on the track member 26. In other words the mechanism 105 provides means facilitating the positioning of the unit 12 (bit 67) to a required position for drilling a hole 24 without disturbing the chain 84 through the securing and adjusting means 85.

The operating relation of components comprising the unit 12, also electrical circuitry rendering the unit operable, is schematically shown in FIGURE 11.

In operation, components of the unit 12 are rendered operational by 24 v. D.C. and the motor 38. Primary electrical current (115 v. A.C.) from a source (not shown) is supplied via the lines $L_1$–$L_2$. Alternating current supplied by the lines $L_1$–$L_2$ is converted to 24 v. D.C. by conventional means including a transformer 119 and rectifier 121. A connector 122 transmits 24 v. D.C. from the positive side of the rectifier 121 to a binding post 123. Also shown in FIGURE 11 are binding posts 124–129, inclusive, providing electrical contact means for leads extending between components of the unit 12 and a relay panel 131 including relays A–E, inclusive.

Pressurized air is utilized to activate the fluid actuated components of the unit 12. In this respect, compressed air enters the system through a conduit 109 from a source (not shown). The conduit 101 provides a fluid path between the manifold 106 and the assembly 41 at such times as the solenoid of the valve 42 is energized. With the reservoir of the assembly 41 pressurized, compressed air communicates with the gib 47 via conduit 103 and pressurized liquid with the upper end of the chamber 60 of the assembly 39 via conduit 102. Compressed air from the assembly 41 is directed to the atmosphere through conduit 101 and valve 42 at such times as the solenoid of the latter is deenergized. Compressed air is transmitted to the closed end of the housing 77 of the assembly 44 via a conduit 107 at such times as the solenoid of valve 43 is energized. Air from the closed end of housing 77 is ported to the atmosphere via the conduit 107 and valve 43 at such time as the solenoid of this valve is deenergized. Conduits 132 and 133 provide fluid paths between the manifold 106 and the lower end of the assembly 39 and the rod end of the housing 77, respectively.

Flow control valves 104 and 108 are provided in conduits 102 and 107, respectively. The valves 104 and 108 are of identical construction of a type disclosed in U.S. Patent No. 2,841,174. The valve 104 restricts liquid as it flows from the assembly 41 to the assembly 39. Accordingly, liquid acting indirectly on the drill 67 during its feeding or working stroke is metered or restricted. The valve 104 allows unrestricted flow of liquid returning to the assembly 41 insuring quick return of the drill bit to its up position. The valve 108 insures unrestricted flow of air to the assembly 44 and restricted return flow therefrom. The function of the valve 108 and why its function is necessary will be explained as the specification progresses.

Returning now to the primary source of power $L_1$–$L_2$, leads 111, 112, 114, and 116 extend between these lines. Switches 117 and 118 are provided in the leads 111 and 112, respectively, the switches being of the push-button type and are manually operable. The switch 117 normally is closed while the switch 118 normally is open. The lead 114 includes a switch 134 responsive to an air pressure device 137 mounted in the conduit 109 and also a solenoid actuated switch 136. With compressed air entering the system through the conduit 109, it will be apparent that 24 v. D.C. will be supplied to the motor 38 at such times as the switch 118 is momentarily closed.

With the motor 38 activated as described above the unit 12 effects its regular cycle of operation, viz., drilling the spaced holes 24 in the panel 16. The regular cycle of operation of the unit 12 continues uninterruptedly until as unusual situation develops—for example, the drill 67 breaks or the unit 12 is to space itself in an irregular manner.

All electrical circuits activated during the operation of the unit 12 will not be described in detail. The circuits comprising components of the panel 131 are more or less conventional, the manner in which they operate in cooperation with the unit 12 will be readily apparent to those skilled in the art. However, specific circuits that are activated in the event of drill breakage and during hole skipping operations will be specifically pointed out.

The normal operation of the unit 12 follows: Compressed air is utilized during the up or non-working stroke of the drill 67 (quill 32 and spindle 64 of the assembly 39), this air being transmitted from the manifold 106 via the conduit 132. As the spindle 64 and drill 67 reach their full up positions the arm 72 contacts and closes the switch 73. As a result of closing switch 73 the solenoid of valve 43 is energized. Compressed air is now directed to the closed end of the escapement actuator assembly 44 via conduit 107. As the rod 78 of the assembly 44 is extended the unit 12 is advanced a distance equal to the pitch of the chain 84, this movement is effected by the escapement mechanism as previously explained. As the rod 78 becomes fully extended the end thereof contacts and closes the switch 79. Circuitry is now activated functioning to energize the solenoid of the valve 42. Accordingly, compressed air is directed to the assembly 41, the gib 47 is activated by compressed air directed thereto via conduit 103. Movement of the unit 12 relative to the track member 26 is thus precluded and this condition prevails during the down or working stroke of the spindle 64. Simultaneously as air activates the gib 47, liquid is directed to the upper end of the chamber 60 in assembly 39 functioning to effect the down or working stroke of the drill 67. One of the holes 24 is now drilled. As the quill 32 and spindle 64 reaches their full down position the solenoid of valve 42 is deenergized. Compressed air from the assembly 41 and gib 47 is now ported to the atmosphere via conduit 103, 101 and valve 42. Liquid in the assembly 39 is also free to return to the reservoir of the assembly 41. Compressed air transmitted to the lower portion of the chamber in assembly 39 is again unopposed and functions to effect the upstroke of the quill 32 and spindle 64 in the manner previously described. Thus a complete normal operating cycle of the unit 12 is completed, this cycle continuous uninterruptedly until some unusual situation occurs or the operation of the unit 12 is manually discontinued utilizing the switch 117 for this purpose.

Assuming now that a drill bit 67 breaks during a down stroke or drilling operation of the unit 12. Such a condition occurs quite frequently due to the different in hardness between materials comprising the panel 16 and also due to the fact that the bit 67 is not properly supported by the honeycomb 22 between the skins 19 and 21. Because of the rapidity of the drilling operation, structure functioning to provide a drill-breakage surveillance system is incorporated in the unit 12 insuring immediate stoppage thereof.

In this respect it will be noted that bit 67 operates in an aperture provided in a foot-like member 138 comprising a component of the unit 12 but insulated therefrom.

It will be seen that an electrical circuit including the bit 67, member 138 and connector 139 is provided during the normal operation of the unit 12. Vibrations of the bit 67—relative to the aperture in the member 138—normally would result in brief interruptions of the electrical circuit just described, however, under normal operations of the unit 12 the instant circuit is rendered continuous by the condenser $C_2$. However, if the bit 67 breaks the flow of current through the aforementioned circuit is interrupted. The solenoid of switch 136 is no longer energized and the switch 136 opens, accordingly the 24 v. D.C. current is discontinued resulting in stoppage of the motor 38. Thus it will be seen that the operator of the unit 12 is relieved of the responsibility of watching for drill breakage during drilling operations of the unit 12. In other words his time is made available for other and more urgent duties.

Referring now to the hole skipping feature of the unit 12, the mechanism 141 making this operation possible is shown in FIGURE 10. Major components of the mechanism 141 include a block 162 fabricated of a nonconducting material, sleeve and plunger members 163 and 164, respectively, and spring means 166. Components comprising the mechanism 141 are assembled substantially as shown in FIGURE 10, the block 162 is secured to the base member 47 and provides electrical insulation for the sleeve 163 and plunger 164 with respect to the unit 12. The sleeve 163 is mounted in block 162 so that it has a normal relation with respect to the upper surface of the track member 26. The plunger is slideably received in the sleeve 163 and is urged into contacting relation with the track member 26 by the spring means 166. Electrical contact with the plunger 164 is effected through the connector 147.

As long as the unit 12 is drilling holes in a normal manner the plunger 164 continuously contacts the member 26. However, if the unit 12 is to skip a predetermined number of holes—for example, holes which if drilled in the panel 16 would pass through structural members thereof—a nonconducting tape 167 is secured to the upper surface of the member 26 is the path of the plunger 164. Accordingly, electrical circuits to be presently described are activated and deactivated rendering the spindle of assembly 39 inoperable and the escapement assembly 44 operable during this time. In other words the assembly 44 functions to move the unit 12 longitudinally on the track member 26 during this operation without drilling holes.

The longitudinal movement of the unit 12 referred to above occurs at such time as the bit 67 has completed its upstroke. Longitudinal movement of the unit 12 is initiated by deactivation of a circuit including connectors 147, 144, 146 and coil $C_2$–$C_7$ of relay C. This circuit is deactivated due to the fact that the plunger 164 contacts the tape 167, at this time the movable contact members of relay C are in position shown by solid line construction in FIGURE 11. In this respect the contact members of all relays are in their solid line positions as shown in FIGURE 11 at such times as their respective coils are deenergized.

As the spindle 64 reaches the upper limit of its upstroke, the arm 72 contacts and closes the limit switch 73 activating a circuit including connectors 156–159, inclusive, also coil $E_2$–$E_7$ of relay E. This action closes contacts $E_6$–$E_8$ of relay E and these contacts remain closed throughout the skipping operation.

At this time the solenoid of valve 42 will be deactivated and will remain so although the contacts $D_6$–$D_8$ are subsequently momentarily closed due to the escapement switch 79 being closed. In the later case the contacts $D_6$–$D_8$ act to provide a circuit, including connectors 152 and 145, this circuit will be broken by contact $C_6$–$C_8$ of relay C. Thus it will be seen that the solenoid of valve 42—consequently, the spindle assembly 39—will be deactivated and will remain so until electrical contact is again established between the plunger and base members 164 and 26, respectively.

With the energization of the coil E2–E7 the contacts E6–E8 of the relay E are closed and a circuit activated including the solenoid of valve 43, connectors 161, 162, 159 and the lead 148 returning to the positive lead 146 (post 123). Accordingly, pressurized air is directed to the closed end of housing 77 of the escapement assembly 44. The pressurized air acts to extend the rod 78 resulting in the unit 12 being advanced a distance equal to the pitch of the chain 84 or in other words the distance between two adjacent holes 24. As the rod 78 reaches its fully extended position the escapement limit switch 79 is closed.

Closing of the switch 79 activates a circuit including connectors 155, coil D2–D7, 148 and 146, this action closes contacts D1–D3 and D6–D8. With contacts D1–D3 closed, current flows through the circuit including connectors 146, 148, resistor 149, connectors 150, 153, 154, coil B2–B7 of relay B and contacts C4–C1 of relay C. This last described circuit also allows a positive charge to build-up on a condenser $C_1$. It will now be seen that a circuit including the solenoid of valve 43 and connector 161 is deactivated due to the contacts B4–B1 of relay B being broken. Accordingly the solenoid of valve 43 is deenergized functioning to port air from the closed end of housing 77 to the atmosphere via conduit 107.

The return flow of air through the conduit 107 is restricted by the valve 108 insuring that a delay occurs in the time required for the rod 78 to retract itself. At the beginning of this time delay (rod retraction), the switch 79 would open and the rod 78 would immediately be returned to its fully extended position before the rod 78 was sufficiently retracted to allow the pawl 94 to pickup a new tooth of the sprocket 82. In other words the rod 78 would oscillate or chatter between its fully extended position and a partially retracted position without imparting longitudinal movement to the unit 12 if it was not for the positive charge on condenser $C_1$. The return stroke of the rod 78 is activated by compressed air entering the assembly 44 through conduit 133.

As the switch 79 opens at the beginning of the retraction stroke of the rod 78, the positive charge of the condenser $C_1$ dissipates itself functioning to retain the coil B2–B7 of relay B activated. Accordingly it will be seen that the aforementioned time delay (electrical) is a result of the charge on condenser $C_1$. As the charge dissipates itself the coil B2–B7 will be deactivated, contacts B4–B1 of relay B will again be closed and the solenoid of valve 43 will again be energized. Accordingly, it will be seen that the unit 12 will continue to space itself longitudinally of the track member 26 until the plunger 164 again makes electrical contact with the member 26. As the plunger 164 again contacts the member 26, the contacts C4–C1 will again be closed insuring that the unit 12 will again resume its normal cycle of operation as previously described.

Accordingly, a drilling assembly adapted to drill spaced holes, capable of automatically skipping certain of the holes and of achieving the other object of the invention is provided.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

I claim:

1. In a drilling assembly adapted to drill spaced holes in a panel-like structure, the combination comprising: an elongated flexible track member having parallel opposed side surfaces; said track member being secured to a side surface of a panel-like structure so that the side surfaces thereof have a parallel relation with respect to the side surface of such structure; a drilling unit including a bit member; means mounting said drilling unit on said track member in a manner allowing sliding movement thereof on said track member and insuring a normal relation of said bit member with respect to the side surfaces of said track member; a taught sprocket chain extending throughout the length of said track member; and said drilling unit including mechanical means cooperating with said chain and functioning to advance said drilling unit a predetermined distance along said track member when activated.

2. In a drilling assembly as set forth in claim 1: in which said mechanical means constitutes an escapement mechanism including sprockets meshing with said chain whereby upon activation of said mechanism said drilling unit is advanced an amount equal to the pitch of said chain.

3. In a drilling assembly adapted to drill a pattern of holes in a structure in which some of the holes are equally spaced a predetermined distance apart while the distance between other of the holes exceeds said predetermined distance, the combination comprising: an elongated track member of rectangular configuration in cross-section having parallel side faces and guiding edges; means mounting said track member on a side of a structure with one side face of said track member having a parallel relation with respect to the side surface of such structure; means mounting a drilling unit on the other side of said track member for longitudinal movement along said edges; said drilling unit including a drill bit; a spindle assembly adapted to activate said drill bit; and an escapement mechanism adapted to advance said drill unit equal distances along said side edges; first circuits adapted to alternately activate said spindle assembly and escapement mechanism; second circuits including a spring loaded member adapted to render said spindle assembly inoperative at such times as the last named circuits are deactivated; and third circuits adapted to activate said escapement mechanism at such time as said second circuits are deactivated.

4. In a drilling assembly comprising a drilling unit including a mechanism enabling the unit to automatically space itself with respect to a structure on which the unit is mounted and enabling the unit to be manually moved with respect to the structure at other times, the combination comprising: a chain the ends of which are secured to such structure in a manner rendering the intermediate portion of the chain taught; a drilling unit including an escapement actuator, an adjusting mechanism and a plurality of sprockets some of which have a meshing relation with respect to said chain; said plurality of sprockets including drive and a driven sprocket; said drive sprocket and adjusting mechanism normally cooperating with each other enabling said unit to automatically advance itself along said chain each time said escapement actuator is activated; and said adjusting means including mechanical means enabling said drilling unit to be manually moved with respect to said chain.

5. In a drilling assembly as set forth in claim 4: in which said drilling unit includes a pin rotatably mounted therein; said driven sprocket being mounted on said pin for rotation therewith; said drive sprocket being mounted for free rotational movement on said pin; and said mechanical means having effective and non-effective positions rendering said drive sprocket unitary and non-unitary, respectively with said pin.

6. In a drilling assembly adapted to drill holes in a structure constituting honeycomb core material confined between a pair of plane or curved sheets, the combination comprising: an elongated flexible track member having parallel opposed sides, a central section and edge portions; said edge portions constituting ways; the individual thickness of said edge portions exceeding the thickness of said central portion; cup members mounted on one side of said track member functioning to secure said track member to one surface of such structure and providing a parallel relation between the sides of said track member and one surface of such structure at such times as a vacuum is applied to said cup members; a drilling unit; means mounting said drilling unit on said ways; said mounting means including first, second and third gib members attached to said drilling unit; said first and third gib members having a fixed and embracing relation with respect to said drilling unit and ways, respectively, and the second gib member being automatically operable and also having an embracing relation with respect to the other of said ways at a location between said first and third gib members; said second gib member having restricting and non-restricting positions in which movement of said unit is arrested and allowed on said ways, respectively; and said drilling unit including a bit member adapted to drill holes normal to the one suface of such structure as said unit is moved throughout the length of said track member.

References Cited by the Examiner

UNITED STATES PATENTS

| | | | |
|---|---|---|---|
| 2,357,579 | 9/1944 | Conway | 77—13 |
| 2,730,334 | 1/1956 | Sullivan | 77—13 |
| 2,953,044 | 9/1960 | Kimble et al. | 77—5 |
| 2,963,927 | 12/1960 | Hanger | 77—13 |
| 3,119,285 | 1/1964 | Steiner | 77—5 |
| 3,176,587 | 4/1965 | Appleton et al. | |

FRANCIS S. HUSAR, *Primary Examiner.*

J. SPENCER OVERHOLSER, *Examiner.*